ing at their lower ends upon a pan C that
UNITED STATES PATENT OFFICE.

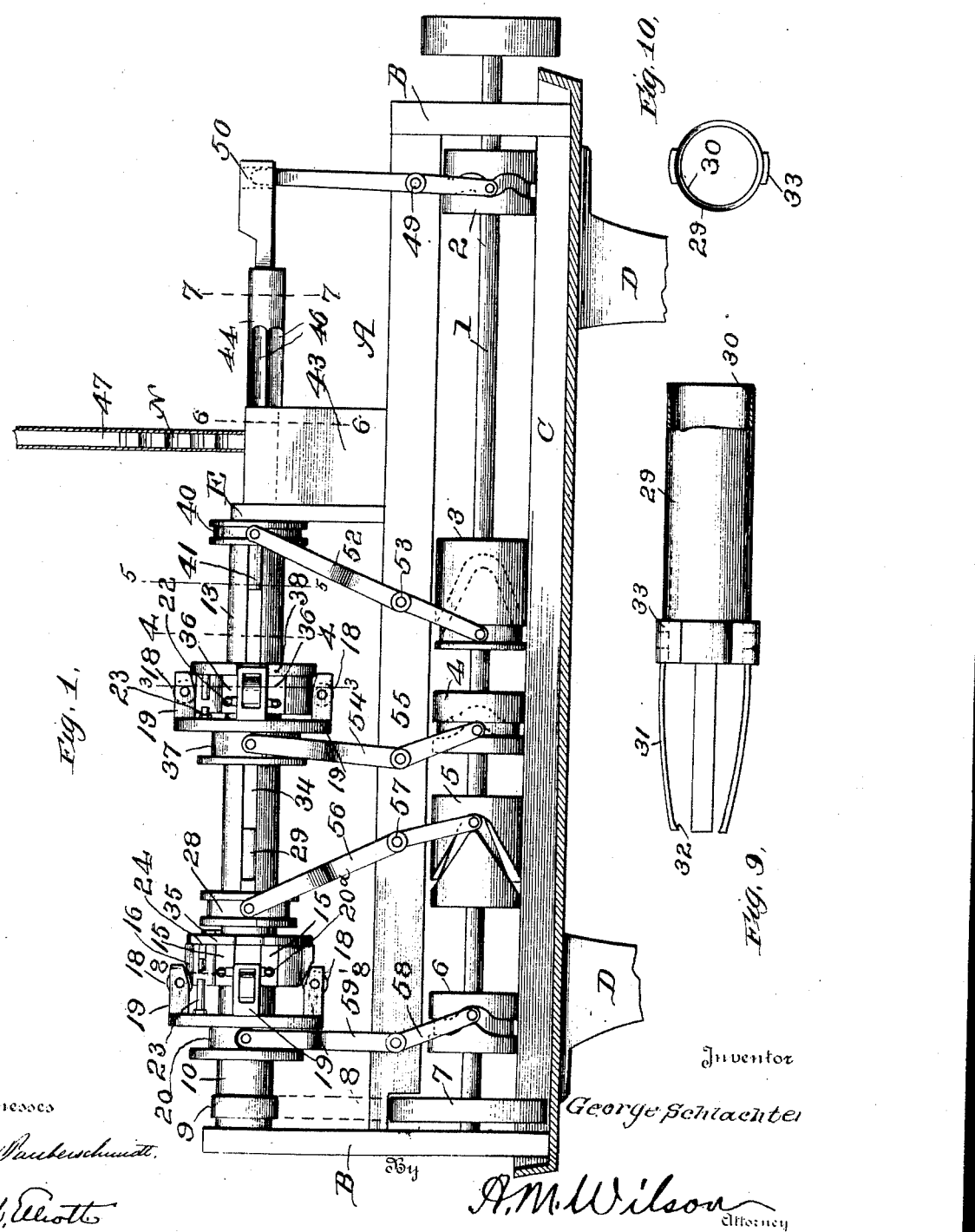

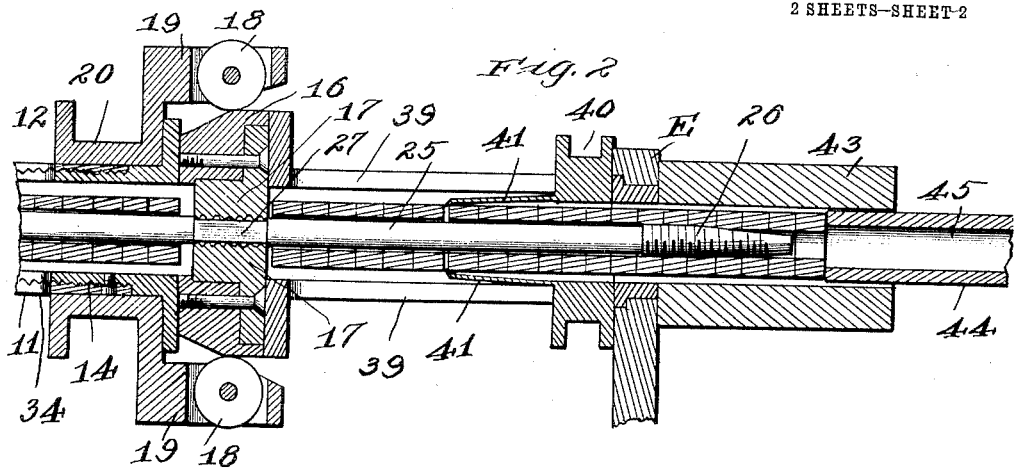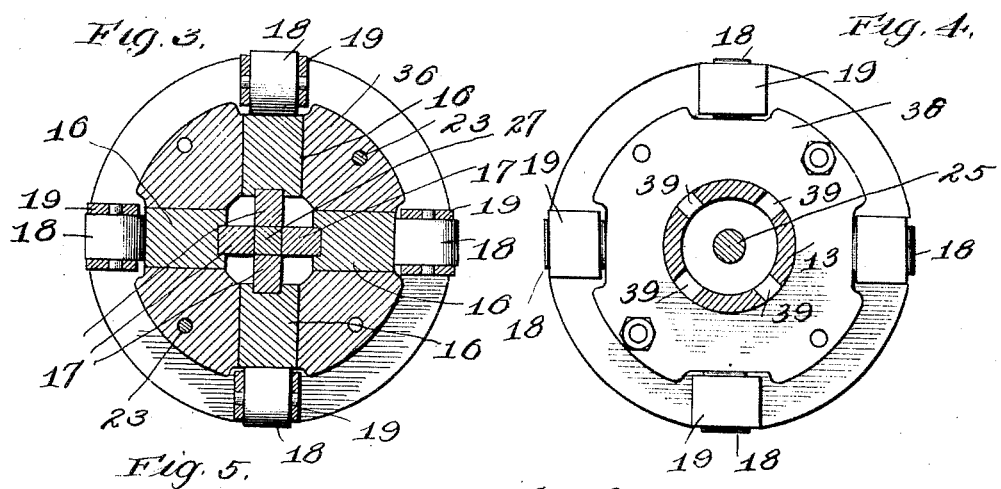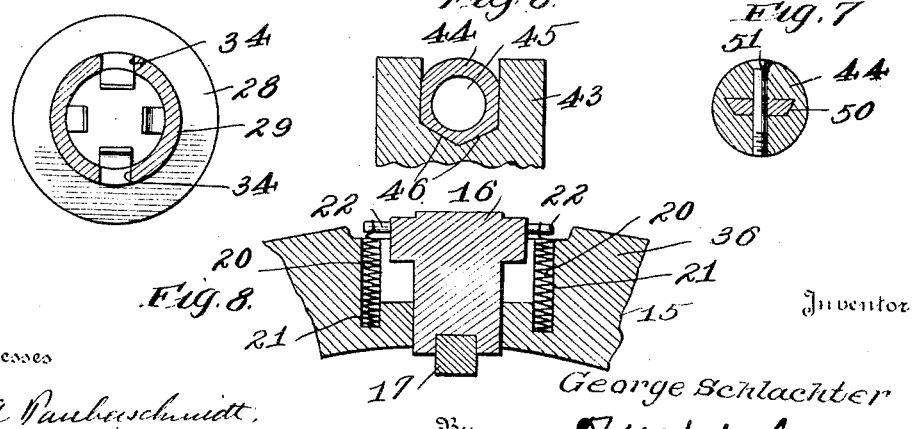

GEORGE SCHLACHTER, OF CLEVELAND, OHIO.

NUT-THREADING MACHINE.

1,099,724.  Specification of Letters Patent.  Patented June 9, 1914.

Original application filed January 5, 1914, Serial No. 810,419. Divided and this application filed January 5, 1914. Serial No. 810,420.

*To all whom it may concern:*

Be it known that I, GEORGE SCHLACHTER, a subject of the King of Hungary, residing at Cleveland, in the county of Cuyahoga and State of Ohio, have invented certain new and useful Improvements in Nut-Threading Machines, of which the following is a specification.

This invention relates to nut threading machines, and constitutes a division of an application for patent for a like apparatus filed of even date herewith, Serial No. 810,419.

An object of the present invention, in common with that above referred to, is to provide a machine which shall in a novel and practical manner, be capable of threading a greater number of nuts in a specified time than has heretofore been accomplished with machines of this character, and in which the mechanism employed is so constructed and arranged as to resist wear, practically eliminate breakage, and facilitate repairs when necessary.

With the above and other objects in view, as will appear as the nature of the invention is better understood, the same consists in the novel construction and arrangement of parts of a nut-threading machine, as will be hereinafter fully described and claimed.

In the accompanying drawings forming a part of this specification and in which like characters of reference indicate corresponding parts:—Figure 1 is a view in side elevation of a nut-threading machine constructed in accordance with the present invention. Fig. 2 is a longitudinal sectional view on an enlarged scale, of the receiving end of the machine. Fig. 3 is a transverse sectional view taken on the line 3—3, Fig. 1. Fig. 4 is a similar view taken on the line 4—4, Fig. 1. Fig. 5 is a similar view taken on the line 5—5, Fig. 1. Fig. 6 is a similar view taken on the line 6—6, Fig. 1. Fig. 7 is a similar view taken on the line 7—7, Fig. 1. Fig. 8 is a similar view taken on the line 8—8, Fig. 1. Fig. 9 is a side elevation, partly in section, of one of the nut ejectors, and, Fig. 10 is an end elevation of the ejector shown in Fig. 9.

Referring to the drawings, A designates generally, the bed of the machine which is supported upon uprights B, the latter resting at their lower ends upon a pan C that is designed to catch debris and oil accumulating in the operation of the machine, the pan being supported by suitable legs D. As the precise construction of the frame does not enter into the novelty of the invention, further description thereof is deemed unnecessary.

Journaled in the uprights B is a shaft 1 carrying five peripherally-grooved cam drums 2, 3, 4, 5, and 6. The cam 2 is of the six-throw type, while the remaining cams are of the two-throw type. The shaft 1 is driven from any suitable source of power and carries on one end a pulley 7 around which passes a belt 8, indicated by dotted lines in Fig. 1 that passes around a pulley 9 carried by one end of the spindle of the machine. The spindle comprises four sections 10, 11, 12, and 13, the members 11 and 12 being connected by threads 14. The member 10 is provided at its inner end with a chuck 15, the parts being integral, and the chuck carries four radially-arranged jaws 16, the inner ends of which have inset therein serrated fillers 17, the function of which will presently appear. The jaws normally project beyond the outer periphery of the head and are beveled at one end, and these beveled portions are designed to be engaged by rollers 18 carried by arms 19 projecting from a sleeve 20 mounted upon the spindle member 10, the jaw 16 being normally held in the path of movement of the rollers by coiled springs 20 seated in sockets 21 in the chuck 15 and bearing against the terminals of the pin 22 which extends through the jaw, as clearly shown in Fig. 9. The sleeve 20 is guided relatively to the head 16 by a plurality of pins 23 that engage with sockets 24 formed in the chuck. The collar and its complemental parts, as above described, constitute a means for closing the jaws of the chuck to bring the same into engagement with the shank 25 of the tap 26, the latter being provided at its rear end with a squared portion 27 to be engaged by the chuck jaws. Mounted to slide upon the sections 11 and 12 of the spindle is a collar 28, and secured to this collar is one of the nut ejectors shown in detail in Fig. 10, each ejector comprising a tubular member 29 having its bore flared at 30, four inwardly-curved resilient fingers 31 terminating internally with cam-shaped lugs 32, and a pair of laterally-projecting orificed lugs 33 that are designed to project through slots 34 formed in the spindle members 11 and 12. The spindle member 11 is provided at one end with a flange 35 that is securely bolted to the chuck and holds the same rigid in operation.
The spindle section 12 carries a chuck 36, the counterpart of that already described, and with which co-acts a collar 37, the counterpart of the collar 20, and carrying chuck jaw-closing mechanism, the same as that described. The section 13 of the spindle is provided with a flange 38 that is bolted to the chuck 36 in the same manner as the flange 35. The section 13 is provided with four longitudinal slots 39 (Fig. 5) through which project screws carried by a peripheral grooved collar 40 that engages with a nut ejector 41, the counterpart of that shown in Fig. 10, with the difference that it is somewhat shorter, for the purpose that will presently appear. Adjacent to the outer end of the spindle is a squared portion 42 that is designed to be engaged by the jaws carried by the chuck 36, the slots 39 terminating short of the outer end of the section 13 in order to prevent its accidental disconnection therefrom.

In order to support the spindle for rotation, one end thereof is journaled in the upright or standard B, and the other end in a similar standard E supported by the bed A.

Arranged in front of the collar 40 is a block 43 (Fig. 7) provided with a longitudinally-disposed channel in which works a plunger 44, the plunger being provided with a bore 45 to receive the end of the tap and its lower side being oppositely beveled at 46 to engage the similarly-shaped bottom of the groove in the block, thus to guide the plunger in operation. Communicating in any suitable manner with the groove of the block is a magazine 47 in which the blank nuts N are disposed, and feed by gravity down into the groove of the block from which they are forced by the plunger onto the threaded end of the tap.

As will be obvious, all of the parts should be so timed as to insure accuracy of operation, and in the present instance, it is designed that six nuts at a time shall be discharged from the rear end 10 of the spindle, and this is accomplished by making the cam 2 of the six-throw type as before described. This cam is engaged by the lower end of a lever 48 pivoted at 49 to the bed, and having its upper end seated in a recess in the outer end 50 of the plunger. As shown in Fig. 8, the plunger is in two parts, the part 50 being seated in a dove-tail shaped recess in the plunger and being held therein by a screw 51.

The cam 3 is engaged by the lower end of a lever 52 pivoted at 53 to the bed, the upper end of the lever being in engagement with the peripheral groove of the sleeve 40. The cam 4 is engaged by the lower end of the lever 54 pivoted at 55 to the bed, the upper end of the lever being in engagement with the peripheral groove of the sleeve 37.

The cam 5 is engaged by the lower end of a lever 56 pivoted at 57 to the bed, the upper end of which engages with the peripheral groove in the collar 28, while the cam 6 is engaged by the lower end of the lever 58 pivoted at 59 to the bed and having its upper end in engagement with the groove of the collar 20.

In the operation of the apparatus, the spindle being positively driven and carrying with it the tap, the parts will be in the position shown in Fig. 1 wherein the jaws of the chuck 36 are locked and those of the chuck 15 unlocked. As the machine is driven, and the plunger feeds the nuts onto the tap, these will be progressively threaded and forced through the nut ejector 41, along the shank of the tap, the fingers of the ejector closing in behind each nut as it is projected through the carrier, so that there can be no retrograde movement of the nuts. As soon as six nuts have been disposed upon the shank, the portion of the cam groove necessary to throw the lever 52 becomes operative and shifts the sleeve or collar 40 toward the chuck 36, and at the same time the lever 54 will be operated to open the jaws of the chuck 36 and close those of the chuck 15 so that at all times the tap will be driven. As the operation proceeds, the ejector 29 will become filled with nuts, and as the collar 28 is reciprocated by the cam 5, it will be forced on to the shank of the spindle in advance of the fingers 31 and upon the cam 5 actuating the collar 28 to the left, the ejector 29 will be projected between the jaws of the chuck 15 which have been previously opened while those of the chuck 36 have been closed. When the ejector 29 is moved forward to bring its fingers within or between the jaws of the chuck 15, the contained nuts will be forced off of the shank and into the portion 10 of the spindle, whereupon the cam 5 will re-actuate the collar 28 in the opposite direction, to bring it back to permit the nut ejector to receive a fresh charge of nuts, the chuck 15 being now locked and the chuck 36 unlocked.

The operation of the apparatus is exceedingly rapid and effective, and will require no attention other than to see that the parts are properly oiled and that the magazine is supplied with blank nuts.

What I claim as new and desire to secure by Letters Patent is:—

1. In a nut threading machine, the combination with a hollow spindle provided with longitudinal slots, of a nut ejector arranged within the spindle and provided with lugs to engage the slots, said ejector being provided with a plurality of incurved resilient fingers.

2. An ejector for nut-threading machines comprising a tubular member having a bore flared at one end, and laterally projecting lugs, and resilient inwardly curved fingers formed with lugs.

In testimony whereof I affix my signature in presence of two witnesses.

GEORGE SCHLACHTER.

Witnesses:
JOHN SZAIBEL,
VENDEL GRUBER.